United States Patent [19]
Park

[11] Patent Number: 6,094,615
[45] Date of Patent: Jul. 25, 2000

[54] SPEED LIMIT CONTROL SYSTEM AND METHOD FOR VEHICLES

[75] Inventor: Sung Min Park, Seoul, Rep. of Korea

[73] Assignee: Hyundai Motor Company, Seoul, Rep. of Korea

[21] Appl. No.: 08/684,060

[22] Filed: Jul. 19, 1996

[30] Foreign Application Priority Data

Jul. 21, 1995 [KR] Rep. of Korea ............ 95-21584

[51] Int. Cl.$^7$ .............. B60T 7/12; G05D 1/00; G06F 17/00
[52] U.S. Cl. .............. 701/96; 701/79; 701/93; 701/101; 123/90.15
[58] Field of Search ............ 701/1, 3, 5, 7, 701/8, 29, 79, 93, 96, 99, 110, 103, 104, 105, 101; 123/90.15, 90.17, 436, 406.47, 488; 340/825.34, 825.31, 825.25

[56] References Cited

U.S. PATENT DOCUMENTS

| | | | |
|---|---|---|---|
| 3,766,367 | 10/1973 | Sumiyoshi et al. | 701/93 |
| 4,644,922 | 2/1987 | Glockler et al. | 123/493 |
| 4,909,224 | 3/1990 | Nishiyama et al. . | |
| 4,930,477 | 6/1990 | Nanyoshi et al. | 701/105 |
| 5,038,287 | 8/1991 | Taniguchi et al. | 701/99 |
| 5,040,121 | 8/1991 | Etoh et al. | 701/93 |
| 5,260,876 | 11/1993 | Oo et al. | 701/93 |
| 5,365,440 | 11/1994 | Abe et al. | 701/41 |
| 5,422,811 | 6/1995 | Togai | 701/99 |
| 5,477,827 | 12/1995 | Weisman, II et al. | 123/436 |
| 5,568,962 | 10/1996 | Enomoto et al. | 303/3 |
| 5,590,636 | 1/1997 | Yamashita | 123/564 |
| 5,709,179 | 1/1998 | Hara et al. | 123/90.15 |

FOREIGN PATENT DOCUMENTS 6-59786  3/1994  Rep. of Korea .

Primary Examiner—William A. Cuchlinski, Jr.
Assistant Examiner—Gertrude Arthur

[57] ABSTRACT

A speed limit control system and method for vehicles, which can control both the amount of fuel injection and ignition timing of an engine so as to restrict speed more than a regulation speed includes a vehicle speed sensor for generating electronic signals in accordance with an actual vehicle speed; a control device for judging the actual vehicle speed in accordance with signals from the vehicle speed sensor, outputting control signals for controlling ignition timing of an engine and the amount of the fuel injection in accordance with the speed variation in order not to exceed a predetermined regulation speed; an ignition device for igniting at a predetermined timing by signals, the signals being transferred from the engine control device; and an injection device for injecting the predetermined amount of fuel by signals, the signals being transferred from the engine control device.

23 Claims, 4 Drawing Sheets

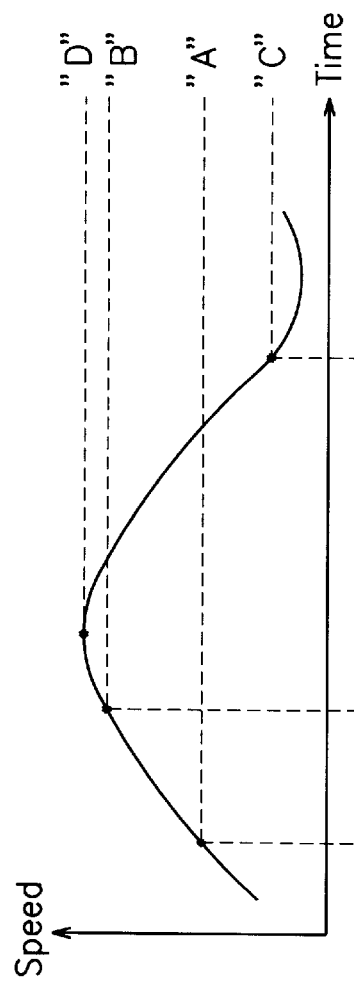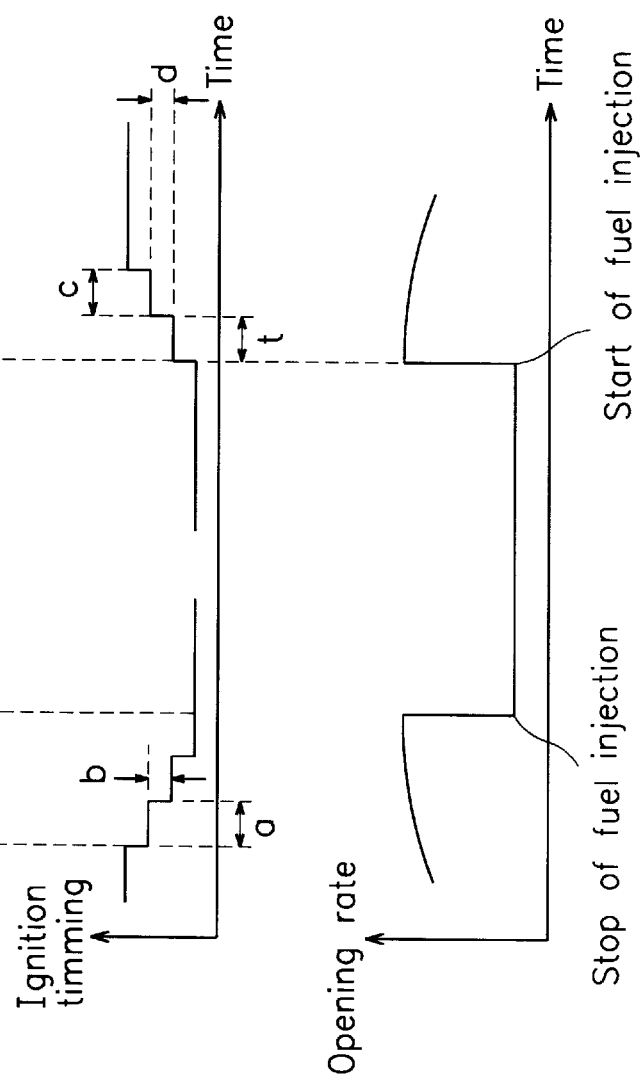
FIG. 3A
FIG. 3B
FIG. 3C

6,094,615

SPEED LIMIT CONTROL SYSTEM AND METHOD FOR VEHICLES

BACKGROUND

The present invention relates to a speed limit control system and method for vehicles, and more particularly, to a speed limit control system, which can control both the amount of fuel injection and ignition timing of an engine so as to restrict speed.

A vehicle's top speed or a maximum revolutions per minute (RPM) of an engine is normally limited by a speed limit particular to each country so as to enhance safety and even save lives.

In limiting the speed or RPMs for vehicles for the above reasons, the prior art decelerates the vehicle by diminishing the amount of fuel injection when the speed of the vehicle is over a predetermined speed.

If the vehicle is travelling at a high speed, it is decelerated by diminishing the amount of fuel injection so as to limit overspeeding, and engine power is suddenly diminished so that the engine receives a shock by the abrupt difference in torque.

Accordingly, this sudden change in torque causes problems in that the life of the engine is shortened.

SUMMARY

It is an object of the present invention to provide a speed limit control system and method for vehicles in which engine shock generated by torque difference is diminished by controlling both the amount of fuel injection and ignition timing of an engine so as to control vehicular speed maintain vehicle speed under a speed limit.

To achieve the objects, the present invention provides a speed limit control system including: a vehicle speed sensor, which generates electronic signals in accordance with an actual vehicle speed;

a control device, which judges the actual vehicle speed in accordance with signals, the signals being transferred from the vehicle speed sensor, the control device outputting control signals for controlling ignition timing of an engine and the amount of the fuel injection in accordance with the speed variation in order not to exceed a predetermined regulation speed;

an ignition device, which ignites at a predetermined timing by signals, the signals being transferred from the engine control device; and an injection device, which injects the predetermined amount of fuel by signals, the signals being transferred from the engine control device.

According to another aspect, the present invention also provides a speed control speed method including:

a step in which the control device reads signals transferred from the vehicle speed sensor and judges whether the read speed reaches the first predetermined speed;

a step in which the control device outputs control signals for delaying the ignition timing toward the ignition device by calculating the first rate of change of the engine when the actual vehicle speed reaches the first predetermined speed;

a step in which the control device judges whether the read speed is equal to the second predetermined speed, after it reads signals from the vehicle speed sensing portion;

a step in which the fuel injection is stopped when the actual vehicle speed reaches the second predetermined speed and control signals for injecting the fuel is outputted toward the fuel injection device, after the control device reads the signals from the vehicle speed sensor and judges whether the read vehicle speed reaches the third predetermined speed; and a step, which the control device counts the time elapsed after injecting the fuel again, calculates the second rate of change if the elapsed time reaches the predetermined time, and outputs the control signals for advancing the ignition device in accordance with the calculated second rate of change until the state of the vehicle returns to a normal condition.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 3 is a graph illustrating a control action in accordance with a preferred embodiment of the present invention.

DESCRIPTION

A preferred embodiment of the present invention will now be described in detail with reference to the accompanying drawings.

Figure 1:
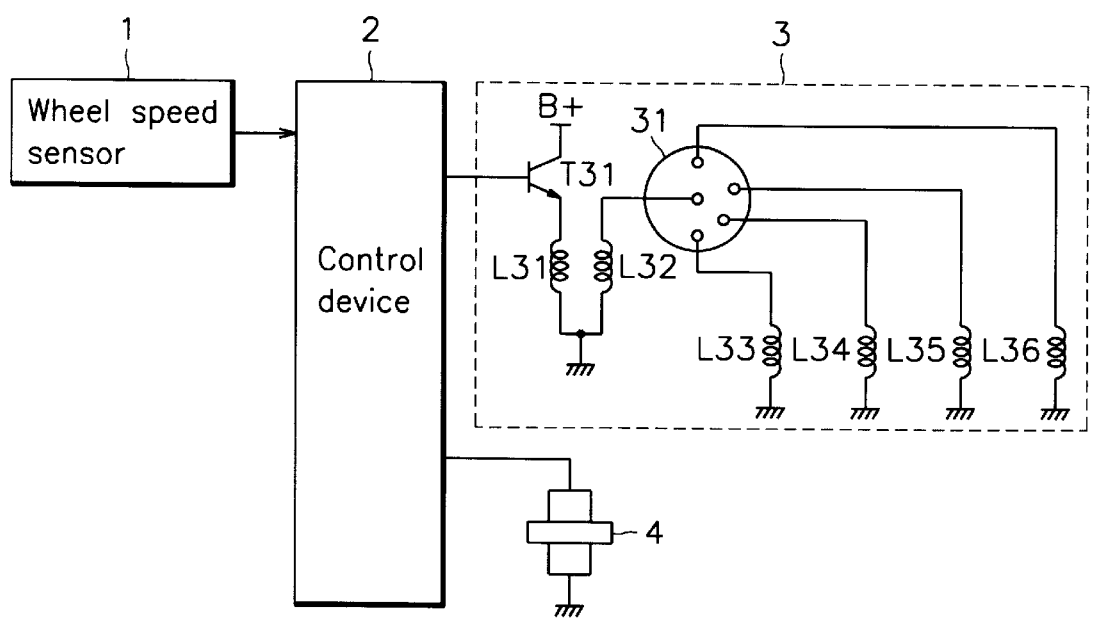
FIG. 1 is a block diagram illustrating a speed limit control system for vehicles in accordance with a preferred embodiment of the present invention.

Referring to FIG. 1, a speed limit control system according to the present invention includes a wheel speed sensing portion 1 for generating electric signals in accordance with an actual vehicle speed; a control device 2 for outputting control signals, which judges an actual vehicle speed in accordance with signals from the wheel speed sensing portion and controls ignition timing and the amount of fuel injection of an engine in order not to exceed a predetermined vehicle speed; an ignition portion 3, which ignites at predetermined timing by signals, the signals being outputted from the engine control device 2; and an injection portion 4, which injects the predetermined amount of fuel by signals, the signals being outputted from the engine control device 2.

Figure 2A:
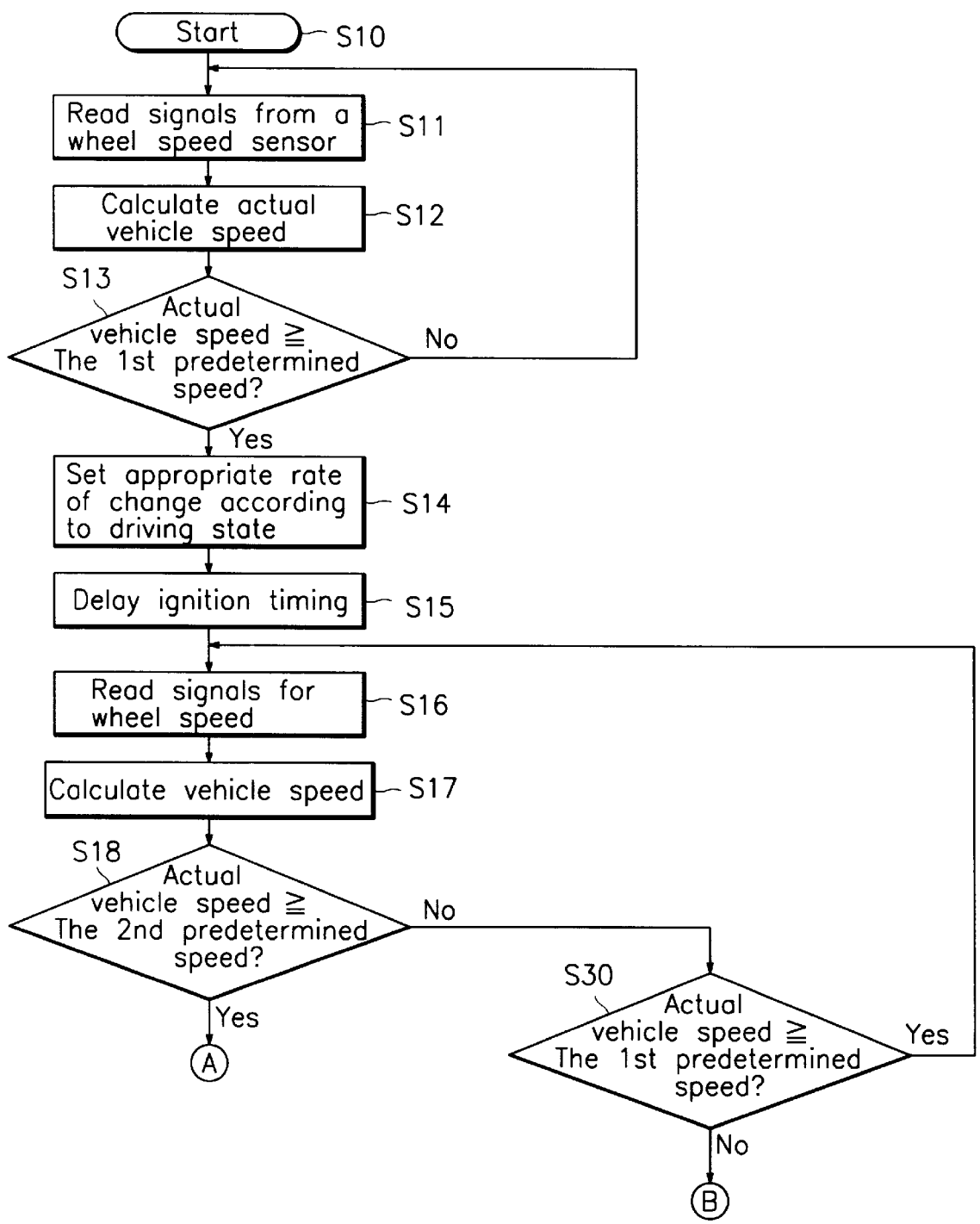
FIG. 2A is a flowchart illustrating a speed limit control method for vehicles in accordance with a preferred embodiment of the present invention.
Figure 2B:
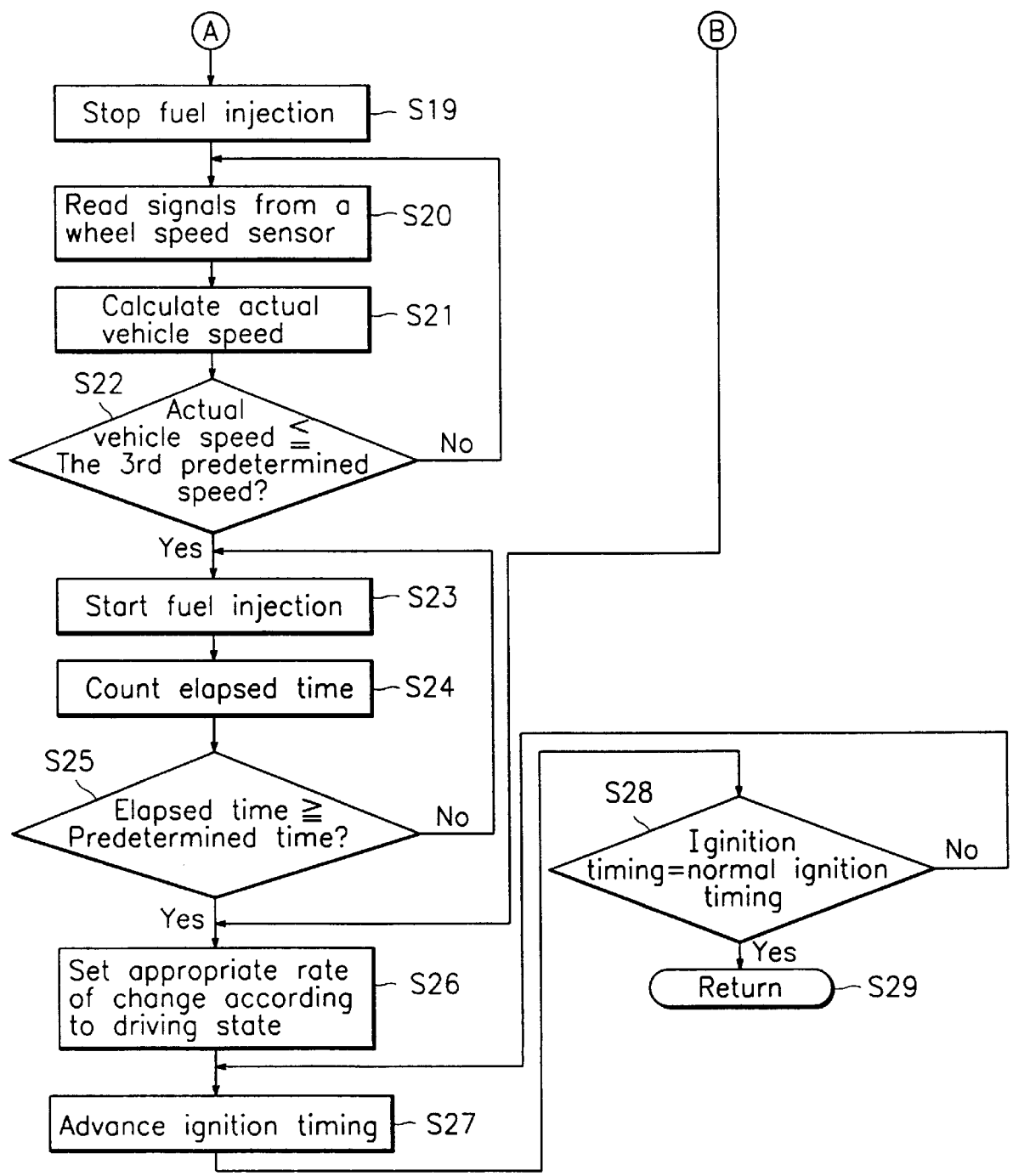
FIG. 2B is a flowchart continued from FIG. 2A.

The execution of the speed limit control system, which is structured like the above has the following steps as shown in FIGS. 2A and 2B.

When the source of electric power for an execution is supplied, the control device 2 starts execution, in step S10; to control the engine in order that the actual vehicle speed does not exceed the predetermined vehicle speed.

Next, the control device 2 reads signals from the wheel speed sensing portion 1 in step S11, and calculates, in step S12, the present actual vehicle speed.

More precisely, the above steps are done through following process: the wheel speed sensing portion 1 generates signals in accordance with the state of wheel rotation, the magnetic field of the wheel speed sensor, which is disposed in a knuckle is intermitted in accordance with the rotation state of a sensor rotor mounted on a drive shaft or a wheel hub, and an output voltage is changed in accordance with rotation speed variation of the sensor rotor and the control device 2 calculates the actual vehicle speed by judging the output voltage.

If the actual vehicle speed is calculated by using the output signals of the wheel speed sensing portion 1, the control device 2 judges whether the calculated speed exceeds the first predetermined speed A' in step S13.

Accordingly, when the calculated actual vehicle speed exceeds the predetermined vehicle speed A', the control device 2 judges if the actual vehicle speed could exceed the predetermined regulation speed D'. Then, the control device 2 executes a deceleration of the actual vehicle speed. This process is described in greater detail below.

The first predetermined speed A' is set lower than the predetermined regulation speed D' in order that the time delay that is generated from the control action for limiting the vehicle speed does not cause the actual vehicle speed to exceed the predetermined regulation speed D'.

If, in step S13 the actual vehicle speed does not exceed the predetermined speed A', the control device 2 returns to step S11. Next, after the control device 2 judges whether the actual vehicle speed exceeds the regulation speed, the control device 2 executes the action for normalizing the engine; also discussed in more detail below.

Accordingly, if the actual vehicle speed exceeds the first predetermined speed A', the control device 2 sets the predetermined rate of change in accordance with the actual driving state in step S14, and in step S15 outputs control signals to the ignition device in accordance with the predetermined rate of change (hereinafter "the predetermined first gradient"). The control signals delay the ignition timing to the state of the predetermined first gradient.

As illustrated in a graph B of FIG. 3, the amount of the variation b/a that is applicable to the each predetermined ignition time a and ignition timing b in accordance with the actual driving state is respectively predetermined and is respectively stored in a memory address of a memory unit so as to calculate the first gradient that controls the delay of the ignition timing.

The control device 2 reads the rate of change in accordance with an actual driving state, the actual driving state being judged by RPM or the degree of acceleration. Then, the control device 2 allows spark plugs to delay the ignition timing in accordance with the calculated rate of change.

The control device 2 allows a power transistor T31 for the switching action to operate and it allows ignition coils L31, L32 to transform high voltages (see FIG. 1).

Therefore, the high voltages, which are transformed through the ignition coils L31, L32 are applied by a distributor to each spark plug L33–L36 so as to execute an ignition motion (see FIG. 1).

The ignition timing of the engine is gradually delayed as much as the above predetermined ignition timing so as to diminish an engine torque.

After delaying operation of the ignition device 3, the control device 2 reads signals from the wheel speed sensing portion 1 in step S16, calculates the actual vehicle speed in step S17, and judges, in step S18, whether the vehicle speed, which gradually increases, reaches a second predetermined speed B'.

If the vehicle speed, which is calculated by the control device 2 reaches the second predetermined speed B', it stops the operation of the appropriate injection device 3 in step S19 so as to stop the fuel injection like in a graph C of FIG. 3.

Therefore, the actual vehicle speed can be gradually decelerated.

However, if the vehicle speed is not greater than or equal to the second predetermined speed B', the control device 2 compares it with the first predetermined speed A' again in step S30 so as to decide whether the speed is higher than the first predetermined speed A'. If the vehicle speed is greater than or equal to the first predetermined speed A', processing returns to step S16. If the vehicle speed is lower than the first predetermined speed A', the control device 2 normalizes the ignition timing.

As the torque of the engine is already diminished by the delay of the ignition timing, which is executed in step S15, the torque difference occurring when the fuel injection is stopped by the control device can be remarkably diminished.

Therefore, the problem of engine shock caused by the torque difference can be eliminated.

If the actual vehicle speed reaches the second predetermined speed B' and the fuel injection is stopped by the control device 2 in step S19, the control device 2 reads the signals from the wheel speed sensing portion 1 in step S21, calculates the actual vehicle speed based on the read signal in step S21, and judges, in step S22, whether the calculated speed is to a third predetermined speed C'. As shown in FIG. 3, the third predetermined speed C' is less than the first and second predetermined speeds A' and B'.

Accordingly, if the actual vehicle speed is decelerated below the third predetermined speed, the control device 2 outputs signals to the injection device 3 so as to inject the fuel in step S23.

But, if the actual vehicle speed is not less than the third predetermined speed C', processing returns to step S20.

Because the driving time of the appropriate injection device 3 in the action order of the fuel injection is changed in accordance with the driving state of the vehicle, the predetermined appropriate amount of fuel is injected in accordance with the driving state of the vehicle.

Accordingly, the control device 2 applies electricity in a solenoid coil so as to maintain the degree of opening of needle valves as much as the predetermined time; the needle valve being internally equipped in the appropriate injection device.

As appropriate amount of fuel is injected again in accordance with the driving state of the vehicle, the vehicle speed that is decelerated by the interception of the fuel is recovered.

After the fuel is injected again, the control device 2 counts the elapsed time in step S24 and judges, in step S25, whether the elapsed time is equal to a predetermined time. If the elapsed time is greater than or equal to the predetermined time, the rate of change for the ignition timing is set based on the driving state in step S26. If the elapsed time is less than the predetermined time, processing returns to step S23.

Accordingly, as illustrated in a graph B of FIG. 3, the control device 2 sets up the advance rate of change d/c in accordance with the driving state of the vehicle in step S26, and advances the sequence in accordance with the driving state of the vehicle in step 27. Then in step S28, the control device 2 determines if the ignition timing equals a normal ignition timing. If so, processing returns in step S29 to step S10. If not equal, processing returns to step S26.

If the actual vehicle speed is limited by the speed limit action for the vehicle as the above, described amount of the fuel injection and the ignition timing are changed step by step in accordance with the variation of the actual vehicle speed.

Hence, the invention can prevent harmful changes in the state of the engine, which is generated by the excessive difference in the amounts of fuel injection, and can prevent shocks caused by operational changes of the engine can also be prevented.

In addition, the invention can protect the engine because it changes the operational state of the engine in sequence without harm.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A speed limit control system for a vehicle powered by an internal combustion engine, comprising:

a vehicle speed sensor sensing a speed of said vehicle;

a controller to reduce said engine output by controlling ignition timing and fuel supply for said engine based on said sensed vehicle speed to prohibit said speed of said vehicle from exceeding a predetermined limit.

2. The speed limit control system of claim 1, wherein said vehicle speed sensor includes a wheel speed sensor, which outputs electric signals by intermitting a magnetic field in accordance with a rotation state of a sensor rotor mounted on one of a drive shaft and a wheel hub.

3. The speed limit control system of claim 1, wherein said controller determines whether said sensed vehicle speed is greater than a first predetermined threshold, and cuts said fuel supply if said sensed vehicle speed is greater than said first predetermined threshold.

4. The speed limit control system of claim 3, wherein said controller delays said ignition timing prior to cutting said fuel supply.

5. The speed limit control system of claim 4, wherein said controller delays said ignition timing at a rate of change according to an actual driving state.

6. The speed limit control system of claim 4, wherein said controller determines whether said sensed vehicle speed falls below a second predetermined threshold after cutting said fuel supply, and resumes said fuel supply to said engine when said sensed vehicle speed falls below said second predetermined threshold.

7. The speed limit control system of claim 6, wherein said controller advances said ignition timing after resuming said fuel supply to said engine.

8. The speed limit control system of claim 7, wherein said controller advances said ignition timing a predetermined period of time after resuming said fuel supply to said engine.

9. The speed limit control system of claim 7, wherein said controller advances said ignition timing at a rate of change according to an actual driving state.

10. The speed limit control system of claim 7, wherein said controller advances said ignition timing until said ignition timing equals a normal ignition timing.

11. The speed limit control system of claim 1, wherein said controller determines whether said sensed vehicle speed is greater than a first predetermined threshold, and delays said ignition timing if said sensed vehicle speed is greater than said first predetermined threshold.

12. The speed limit control system of claim 11, wherein said controller determines whether said sensed vehicle speed is greater than a second predetermined threshold, and cuts said fuel supply if said sensed vehicle speed is greater than said second predetermined threshold.

13. A speed limit control method for a vehicle powered by an internal combustion engine, comprising:

sensing a speed of said vehicle;

reducing engine output by controlling ignition timing and fuel supply for said engine based on said sensed vehicle speed to prohibit said speed of said vehicle from exceeding a predetermined limit.

14. The speed limit control method of claim 13, wherein said controlling step comprises:

determining whether said sensed vehicle speed is greater than a first predetermined threshold; and cutting said fuel supply if said sensed vehicle speed is greater than said first predetermined threshold.

15. The speed limit control method of claim 14, wherein said controlling step, prior to said cutting step, comprises:

delaying said ignition timing.

16. The speed limit control method of claim 15, wherein said delaying step delays said ignition timing at a rate of change according to an actual driving state.

17. The speed limit control method of claim 16, wherein said advancing step advances said ignition timing until said ignition time equals a normal ignition timing.

18. The speed limit control method of claim 15, wherein said controlling step further comprises:

determining whether said sensed vehicle speed falls below a second predetermined threshold after cutting said fuel supply; and resuming said fuel supply to said engine when said sensed vehicle speed falls below said second predetermined threshold.

19. The speed limit control method of claim 18, wherein said controlling step further comprises:

advancing said ignition timing after resuming said fuel supply to said engine.

20. The speed limit control method of claim 19, wherein said advancing step advance said ignition timing a predetermined period of time after resuming said fuel supply to said engine.

21. The speed limit control method of claim 19, wherein said advancing step advances said ignition timing at a rate of change according to an actual driving state.

22. The speed limit control method of claim 13, wherein said controlling step comprises:

determining whether said sensed vehicle speed is greater than a first predetermined threshold; and delaying said ignition timing if said sensed vehicle speed is greater than said first predetermined threshold.

23. The speed limit control method of claim 22, wherein said controlling step comprises:

determining whether said sensed vehicle speed is greater than a second predetermined threshold; and cutting said fuel supply if said sensed vehicle speed is greater than said second predetermined threshold.

* * * * *